June 6, 1950   B. G. BARNETT ET AL   2,510,365
FOLDABLE CANOPY FRAME
Filed April 25, 1947   3 Sheets-Sheet 1
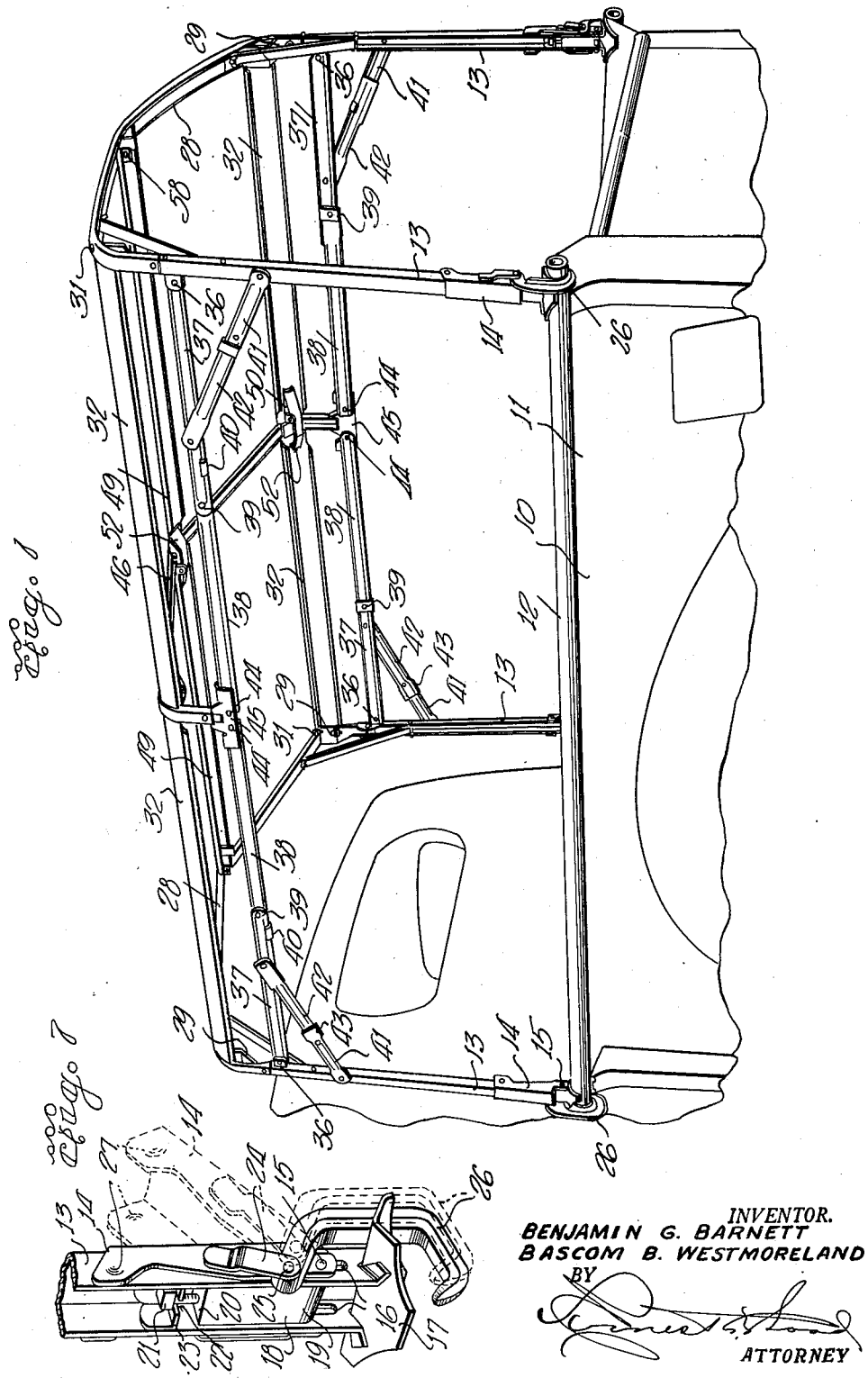
INVENTOR.
BENJAMIN G. BARNETT
BASCOM B. WESTMORELAND
BY
ATTORNEY

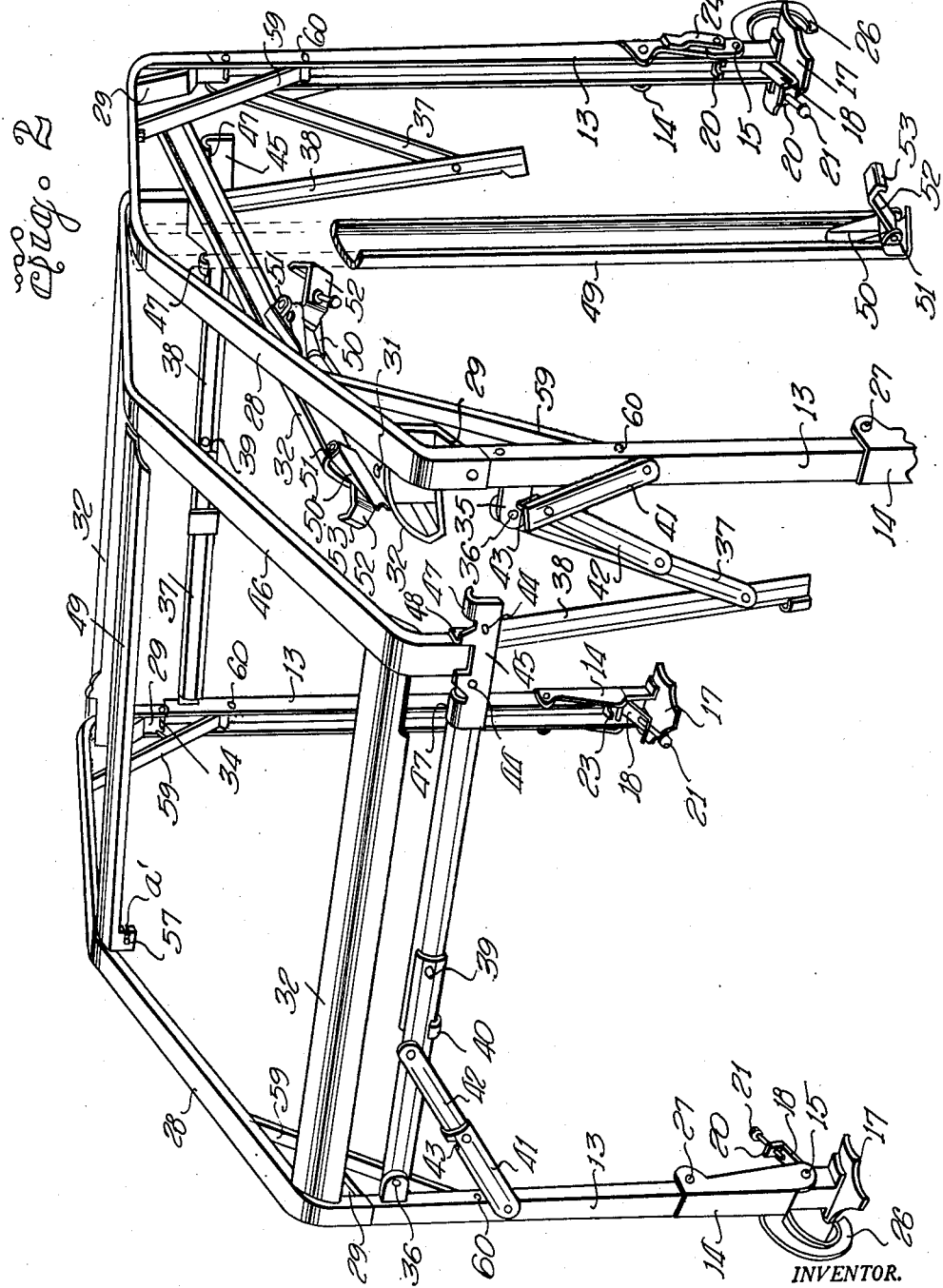

June 6, 1950 B. G. BARNETT ET AL 2,510,365
FOLDABLE CANOPY FRAME
Filed April 25, 1947 3 Sheets-Sheet 3
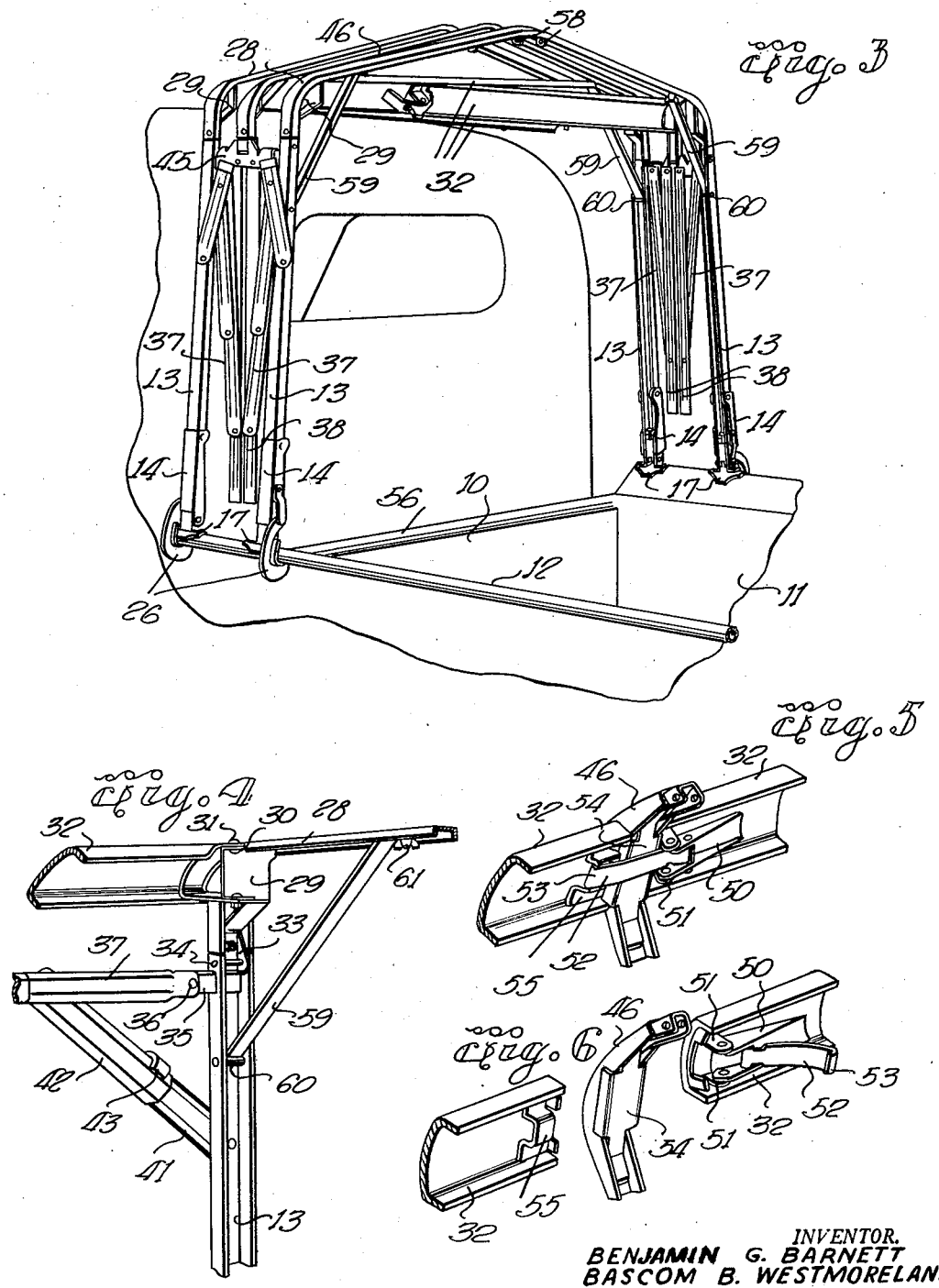
INVENTOR.
BENJAMIN G. BARNETT
BASCOM B. WESTMORELAND
BY
ATTORNEY Patented June 6, 1950

2,510,365

UNITED STATES PATENT OFFICE 2,510,365

FOLDABLE CANOPY FRAME

Benjamin G. Barnett and Bascom B. Westmoreland, Dallas, Tex.; said Westmoreland assignor to said Barnett Application April 25, 1947, Serial No. 743,796

5 Claims. (Cl. 296—105)

This invention relates to collapsible canopy frames and more particularly to frames for trucks, adapted to support fabric covers in extended position and capable of being folded against the cab of the truck when not in use.

The principal object of the invention is to provide an articulated canopy supporting frame whose various parts are connected together in such manner as to be relatively movable, where they constitute foldable elements of the assembly, without the necessity of providing removable bolts, pins or other fastening means. Folding or extending the frame requires the efforts of but one operator and there are no detachable parts to become misplaced or lost.

Another object of the invention is to provide a collapsible canopy frame whose bracing elements are small in number but are so constructed and arranged that when the frame is extended for use, these braces contribute maximum strength to the frame, obviate rattle and eliminate the annoyance due to parts becoming disconnected and lost and on the other hand, the bracing elements may be compactly folded to occupy but the minimum of space when the frame is in folded, yet upright position adjacent the cab of the truck.

With the foregoing and other objects in view, the invention has further reference to certain features of accomplishment which will become apparent as the description proceeds, taken in connection with the accompanying drawing wherein:

Figure 1 is a perspective view of a collapsible canopy frame embodying the invention, shown mounted on a pick-up truck, the latter being fragmentarily illustrated.

Figure 2 is a perspective view of a frame partly folded.

Figure 3 is a perspective view of the frame in folded position on a pick-up truck.

Figure 4 is a fragmentary perspective view of the frame showing a corner detail.

Figure 5 is a rear perspective view of a side rail abutment latch, showing fragmentarily the intermediate bow.

Figure 6 is a view similar to Figure 5 but showing the parts detached, and

Figure 7 is a detail perspective view of one of the toggle clamps for securing the upright frame supporting posts to the bed of a truck.

Continuing with a more detailed description of the drawing, reference numeral 10 denotes fragmentarily the bed of a pick-up truck having the conventional flanged sides 11 provided with scroll edges 12. The primary purpose of the invention is to provide a conveniently manipulable frame to support a cover for trucks of the "pick-up" type but it will become apparent as the description proceeds that with but little variation, the frame may well serve to support a cover as a protection against weather for materials placed on the ground and for other uses.

The frame of the invention is made up of four legs or uprights 13 of channel iron which flanges become increasingly wider towards their lower ends. To secure the lower ends of the uprights 13 to the roll 12 of the truck bed, reference is made to Figure 7 wherein is shown a clamp consisting of a channel-like lever 14 which is pivotally connected to the leg 13 by means of a pin 15 so that it may swing outwardly in the manner shown in dotted lines in Figure 7. The pivot pin 15 is slidable in longitudinal slots 16 in the leg 13. The lower extremity of the leg 13 is shaped to conform with and is welded or otherwise affixed to a saddle 17 which latter rests upon the roll 12 of the truck bed 10. Within the channel of the leg 13 is a strap 18 which has a roll 19 on one end embracing the pivot pin 15 of the lever 14 and on the opposite end, there is provided a right angle bend 20, tapped and threaded to receive a bolt 21. The bolt is received in a slot 22 made in a transverse plate 23 affixed between the flanges of the leg channel.

Welded or otherwise secured to the lever 14 near its midsection is a strap 24 and to the lower end of this strap, which is in offset relation to the pivotal point 15 of the lever 14, is pivotally connected at 25, a hook element 26 which is adapted to extend under the roll 12 of the truck bed.

It is first necessary to adjust the bolt 21 to raise the clamp lever 14 to a height where the tip of the hook 26 will clear the undersurface of the roll 12. When the hook is disposed under the roll, the lever 14, which is in the dotted position shown in Figure 7, is urged to the position shown in solid lines in the same figure. This action causes the hook 26 to advance upwardly against the underside of the roll 12, clamping the leg 13 firmly in place. This action is made possible because of the eccentric afforded by the offset relationship of the strap 24 and the lever 14, combined with the ability of the latter to move longitudinally on the leg 13, by virtue of the slot 16. Once the lever 14 is set, it is held so by the dimples 27 in its flanges adjacent their upper ends which bear frictionally against the flanges of the leg 13. However, there is no lateral stress on the leg at its point of engagement with the roll and there would be little tendency for the lever 14 to become displaced.

The frame proper consists of a bow 28 at each end of the assembly and by referring to Figure 4, it will be observed that a bracket 29 formed from a single piece of metal, provides an extension 30, to which is pivoted at 31, one end of a side rail section 32 as well as affording a depending extension 33, to which is attached, by means of a pin 34, the upper end of the leg 13.

The typical corner detail shown in Figure 4 further shows a flat strap 35 which extends through a slot in one flange of the leg 13 below its pivot point 34. This strap is welded to the leg 13 and to its outer end is pivoted at 36 a side rail brace section 37, which section together with its companion section 38 to which it is pivoted at 39, lies parallel with the side rails 32 when the frame is erected and extended as shown in Figure 1. To maintain the side rail brace sections 37—38 in rigid alignment curved lugs 40, carried by the section 38 are brought up against the under edge of the companion section 37 opposite their pivotal point 39. Elbow braces 41 and 42 are provided for the side rail brace sections 37 at their points of junction with the legs 13. These braces are also provided with retaining lugs 43 to hold them in extended position.

Elbow braces 41 and 42 are held in extended position due to pin joining 41 and 42 being off center in relation to pins joining 41 to 13 and 42 to 37. Retaining lug 43 acts as stop after pin joining 41 and 42 has passed dead center.

It is to be observed in Figure 1 particularly that two sets of side rail brace sections 37—38 are provided for each side of the frame, the inner end of each of the sections 38 being pivoted at 44 to an end of a supporting plate 45 for the middle canopy supporting bow 46. This plate has a lug 47 on each end thereof which bears against the upper edge of the rail brace 38 to prevent downward displacement of the members at the pivotal point 44. Moreover, the plate 45 has parallel ears 48 between which is pivoted the downturned end of the middle bow 46. The corresponding arrangement on the opposite side of the frame is identical to that just described.

Referring again to the side rail sections 32, there are four of such sections, two to the side and are identical in construction, including that fact that they are arcuate in transverse section to present a curved, non-wearing surface to the fabric covering not shown, which overlies and is to be fastened suitably to the frame. This is true also of the ridge rail sections 49, of which there are two, in end to end relationship, when the frame is extended.

To afford a means for securely fastening the confronting ends of the side rail sections to the intermediate bow 46, a latch such as illustrated in Figures 5 and 6 is provided. This latch consists of a lever 50, pivoted at one end to a pair of ears 51 affixed to one end of each of the side rails 32 on the underside between the flanges thereof. Eccentric to the pivotal point of the lever 50 is attached to the latter one end of a strap 52 having a hook 53 on its free end. The ends of the rails 32 butt up against the sides of the intermediate bow as disclosed in Figures 5 and 6 and a brace fitting 54, lying in the channel thereof at the curve, presents a bridge over which extends the latch strap 52 when the latter is in operative position. The hook 53 carried by the strap extends under a loop 55 affixed to the companion rail section 32 on its underside and between its flanges. When the hook of the strap has been so engaged, the lever 50 is urged to a position parallel with the rail section to which it is pivoted, thereby exerting a tension on the strap 52 to bind the parts firmly together. Obviously, release of the latch is quickly accomplished merely by lifting the lever 50 over dead center to relieve the tension on the strap imposed by the eccentric relationship between the pivotal points of the lever and strap.

The latch described is employed also in its identical form to join the inner ends of the ridge rail sections to the apex of the intermediate bow. Moreover, in some instances it is found practicable to employ the latch which joins the ridge rail section to the bow 46 in securing the rearmost of such sections in a vertical position, as shown in Figure 2, by fastening the latch onto the roll 56 (Fig. 3) of the truck bed at the front end thereof after the frame has been fully collapsed. This is done by swinging the ridge rail section downwardly on its pivot 57 provided by a pin passed through the ears 58 carried by the underside of the apex of the bow 28.

To fold the frame, it is necessary only to disengage the three latches joining the inner ends of the rear side rails and ridge rail by displacing the lever 50 of each in the manner described. When this is done, the leg clamps of the rear legs 13 are released and by breaking the rear side rail brace sections 37 and 38 downwardly on their pivots 36 and 44 respectively, by urging upwardly on the joint between 41 and 42, the break occurs as shown in Figure 2, the entire rear portion of the frame may be moved towards the front of the truck bed. At the mid-point, the inner ends of the front side rail sections 32, which were freed from the intermediate bow 46 in dislocating the latches, are turned inwardly in overlapping relationship as were the rear side rail sections 32. The front side rail brace sections 37 and 38 are then broken downwardly on their pivots 36 and 44 respectively, which action will permit the elements of the frame to be moved into juxtaposition as shown in Figure 3. However, it is preferred that the ridge rail sections 49 be detached entirely by moving them into perpendicularity with respect to the bows 28 and, by virtue of the slots a' in their ends, they may be lifted vertically to release them from the pins which secure them to the ears 58 in the apices of the bows 28, although it is possible for them to be released only from the intermediate bow 46 and dropped to a perpendicular position in relation to the truck bed.

In addition to the several bracing members described, each of the end bows 28 has an annular brace 59 whose lower end is pivoted at 60 to the leg 13 just below the junction therewith of the side rail brace section 37 and its upper end is detachably joined to the end bow 28 by means of a wing nut 61. These braces are left intact except when the legs 13 are to be folded into parallelism with the bows 28 and 46 for packaging and shipping or storage. It is clearly apparent how such folding can be accomplished although not illustrated in the drawings, inasmuch as the pivotal points, such as at 34 in Figure 4, as well as the pivotal relationship of the intermediate bow 46 with its mounting plate 45, permit of inward folding of the legs 13, along with their attachments, onto the concave sides of the bows 28 and 46. The frame thus folded makes a very compact package for shipping and storage.

Manifestly, the construction as shown and described is capable of some modification and such modification as may be construed to fall within the scope and meaning of the appended claims is also considered to be within the spirit and intent of the invention.

What is claimed is:

1. A foldable supporting structure for canopies including a frame consisting of identical end sections adapted to be moved into close proximity one with the other in folding said frame, said frame end sections each comprising a bow, parallel side rails whose outer ends are pivoted to the ends of said bow for foldability into parallelism therewith, an upright supporting each end of said bow and hinged thereto for foldability into parallelism therewith, a central bow disposed intermediate said frame end sections and in alignment with the bows thereof, means for latching the inner ends of said side rails to said central bow in extended position of said frame a bracing rail in axially aligned sections for each of said side rails, connected to and extending between said frame end sections and means for pivotally attaching the inner ends of the inner sections of said bracing rails to said central bow below said side rails.

2. A collapsible canopy frame including supporting uprights, a plurality of bows to the ends of which said uprights are pivotally joined at their upper ends for foldability into substantial parallelism with said bows, a pair of sectional side rails whose outer ends are pivotally joined to the end bows of said frame for foldability into substantial parallelism with said bows and whose inner ends are detachably joined to an intermediate bow, latches for connecting the confronting ends of said side rails to said intermediate bow, a sectional bracing rail parallel with each of said side rails in extended position and also displaceable into parallelism with said uprights in collapsed position of said frame and angular bracing means connecting said bows and bracing rails to said uprights in extended position of said frame.

3. A collapsible canopy frame including uprights, a pair of end bows and an intermediate bow, side rails composed of hinged and axially alignable sections, said side rails being pivotally joined at their outer ends to said end bows and foldable inwardly to lie collectively in a horizontal plane and in substantial parallelism with said bows, means for latching the inner ends of said side rails to the centermost of said bows, means for hingedly connecting the upper ends of said uprights to the ends of said end bows whereby said uprights will also be foldable in parallel relationship with said bows, side rail bracing sections connecting the uprights on each side of said frame and lying parallel with said side rails in extended position thereof and foldable into parallelism with said uprights in the collapsed position of said frame and pivotally displaceable means for supporting said side rail bracing sections on said uprights in extended position of said frame.

4. A collapsible canopy frame including an upright for supporting each corner of said frame in erected position, a bow at each end of said frame whose ends are hingedly connected to the upper ends of the uprights at the ends of said frame, said uprights being adapted for foldability into substantial parallelism with said bows, an intermediate bow, side rails in axially aligned sections on each side of said frame having their outer ends pivoted to said end bows and their inner ends connected detachably to said intermediate bow for foldability, a pair of bracing rails, the outer ends of which are pivoted to the uprights on each side of said frame below said side rails and adapted to be folded into parallelism with said uprights and pivotally extensible means for supporting said bracing rails from each of said uprights.

5. In a foldable canopy frame for trucks, a pair of uprights supporting each end of said frame in erect position, a bow at each end of said frame having its ends hinged to the upper ends of corresponding uprights for foldability of the latter into substantial parallelism with said bows, a bow intermediate said end bows, a plurality of side rails in axially aligned sections detachably connected to and extending from said intermediate bow towards and pivoted to each of said end bows, said side rails being foldable into substantial parallelism with said bows in collapsed position of said frame, a sectional bracing rail in axial alignment below and in parallelism with said side rail sections, the outer ends of the outer of said bracing rail sections being pivoted to corresponding uprights for foldability into substantial parallelism therewith and means for stabilizing said bracing rails from each of said uprights.

BENJAMIN G. BARNETT.
BASCOM B. WESTMORELAND.

REFERENCES CITED

The following references are of record in the file of this patent:

UNITED STATES PATENTS

| Number | Name | Date |
|---|---|---|
| 26,547 | Dikeman | Dec. 20, 1859 |
| 160,792 | Saunders | Mar. 16, 1875 |
| 849,675 | Gilleland | Apr. 9, 1907 |
| 2,436,736 | Westmoreland | Feb. 24, 1948 |